US007198257B2

(12) United States Patent
Nanno et al.

(10) Patent No.: US 7,198,257 B2
(45) Date of Patent: Apr. 3, 2007

(54) FLUID-FILLED VIBRATION DAMPING DEVICE

(75) Inventors: Takanobu Nanno, Kasugai (JP); Chiyaki Inoue, Komaki (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 0 days.

(21) Appl. No.: 10/732,012

(22) Filed: Dec. 9, 2003

(65) Prior Publication Data

US 2004/0119215 A1   Jun. 24, 2004

(30) Foreign Application Priority Data

Dec. 10, 2002   (JP)   ............................. 2002-357899

(51) Int. Cl.
*F16F 5/00*   (2006.01)
(52) U.S. Cl. ................................. 267/140.13
(58) Field of Classification Search ........... 267/140.13, 267/140.14, 140.15
See application file for complete search history.

(56) References Cited

U.S. PATENT DOCUMENTS

| 4,420,060 | A | | 12/1983 | Kakimoto ................... 180/300 |
| 4,997,169 | A | * | 3/1991 | Nakamura et al. ..... 267/140.13 |
| 5,901,820 | A | | 5/1999 | Kashiwagi et al. |
| 6,082,717 | A | | 7/2000 | Nanno |
| 6,357,731 | B1 | * | 3/2002 | Tanahashi ............... 267/140.13 |
| 6,425,575 | B1 | * | 7/2002 | Takashima et al. .... 267/140.13 |
| 6,554,263 | B2 | * | 4/2003 | Takashima et al. .... 267/140.13 |

FOREIGN PATENT DOCUMENTS

| EP | 0174184 A2 | 3/1986 |
| EP | 0852304 A1 | 5/2002 |
| JP | 57-9340 | 1/1982 |
| JP | U-57-25231 | 2/1982 |
| JP | 63-97734 | 6/1988 |
| JP | 3-177635 | 8/1991 |
| JP | 5-55739 | 8/1993 |
| JP | 06050378 A | * 2/1994 |
| JP | 7-54131 | 6/1995 |
| JP | 9-166174 | 6/1997 |
| JP | 09-264364 A | 10/1997 |
| JP | 10-184769 | 7/1998 |
| JP | 2001-50333 A | 2/2001 |

OTHER PUBLICATIONS

British Search Report dated Apr. 7, 2004, one page.
Machine Translation of JP 2001-50333.
Concise Explanation Under Rule 98 of JP-U-57-25231.

* cited by examiner

*Primary Examiner*—Thomas Williams
(74) *Attorney, Agent, or Firm*—Beyer Weaver & Thomas LLP

(57) ABSTRACT

A fluid-filled vibration damping device including: a rubber elastic body elastically connecting a first and second mounting member and partially defining a pressure-receiving chamber filled with a non-compressible fluid; a flexible layer partially defining an equilibrium chamber filled with the non-compressible fluid; an orifice passage permitting a fluid communication between the pressure-receiving chamber and equilibrium chamber; and a cushion surface situated opposite to an opening of the orifice passage to the pressure-receiving chamber in a first direction of flow of the fluid into and out of the opening, with a predetermined distance therebetween, while extending in a second direction approximately perpendicular to the first direction.

10 Claims, 10 Drawing Sheets

FLUID-FILLED VIBRATION DAMPING DEVICE

INCORPORATED BY REFERENCE

The disclosure of Japanese Patent Application No. 2002-357899 filed on Dec. 10, 2002 including the specification, drawings and abstract is incorporated herein by reference in its entirety.

BACKGROUND OF THE INVENTION

1. Field of the Invention

The present invention relates generally to fluid-filled vibration damping devices capable of exhibiting damping effect on the basis of flows of the fluid sealed therein, and more particularly to a fluid-filled vibration damping device suitably applicable to engine mounts or other mounts for use in automotive vehicles, for example.

2. Description of the Related Art

Rubber vibration-damping devices, typically including a first and a second mounting member elastically connected via a rubber elastic body, have been widely been used in a variety of fields, as vibration damping couplings or mounts to be interposed between two members of a vibration system. In an attempt to enhance vibration-damping effect, it has been developed a fluid-filled vibration-damping device capable of exhibiting damping effect with the help of resonance or flows of non-compressible fluid sealed therein. Generally, such a fluid-filled vibration damping device is of construction further includes: a pressure-receiving chamber partially defined by the rubber elastic body in order to induce a fluid pressure variation upon application of vibration thereto; an equilibrium chamber partially defined by a flexible layer in order to permit a volumetric change thereof; and an orifice passage for permitting a fluid communication between the pressure-receiving chamber and the equilibrium chamber.

Typical examples of such a fluid-filled vibration damping device are disclosed in the Reference Nos. 1–5 listed herein below, which are applied to an engine mount, a body mount, and other mounts for use in automotive vehicles, for example.

[Reference 1]
JP-A-57-9340
[Reference 2]
JP-B-7-54131
[Reference 3]
JP-A-10-184769
[Reference 4]
JP-A-3-177635
[Reference 5]
JP-B-5-55739

An extensive study and analysis conducted by the inventors on these conventional fluid-filled vibration damping devices revealed that these conventional fluid-filled vibration damping devices may cause noises or vibrations in the event of input of a relatively large vibrational load between the first and second mounting members. Specifically, when being employed as an engine mount in an automotive vehicle, the conventional fluid-filled vibration damping device may generate noises or vibrations large enough to be sensed by passengers in a cabin of the vehicle, if the vehicle runs across a wave-type road, or alternatively runs over a speed breaker or the like.

SUMMARY OF THE INVENTION

It is therefore one object of this invention to provide a fluid-filled vibration damping device of novel construction, which is capable of preventing or minimizing generation of noises or vibrations when subjected to impulsive and tremendous vibration or load, while effectively ensuring its damping effect on the basis of flows of non-compressible fluid filled therein.

As a result of further extensive study and analysis conducted by the inventors on phenomena of generation of noise or vibration in the conventional fluid-filled vibration damping devices, it was revealed that if the vehicle runs across the wave-type road or the speed breaker, an impulsive vibrational load is applied between the first and second mounting members at an acceleration dozens times or more larger than that of engine shakes whose amplitude is largest among vibrational loads applied between the first and second mounting members during ordinary running of the vehicle. Furthermore, a visible specimen of a fluid-filled vibration-damping device was prepared by using transparent components in order to make the pressure-receiving chamber visible. This visible specimen was subjected to such an impulsive vibrational load, and an inside operation of the visible specimen was observed by means of a high-speed camera. This observation of the visible specimen confirms generation of bubbles in the pressure-receiving chamber as a result of cavitation or the like.

As a result of further detail inspection conducted by the inventors on these bubbles, it was founded that these bubbles are generated at around a specific position within the pressure-receiving chamber, and repeat their growing, bursting and disappearing during fluid pressure variation in the pressure receiving chamber due to input of vibrational load. Having considered the theory of cavitation, the inventors reached their knowledge about mechanism of generation of the conventionally experienced noise or vibration. Namely, they considered that these bubbles may be generated during input of the impulsive vibrational load to the device, and held in a static state of approximately spherical configuration during their growing, and finally be deformed and burst, to thereby generate a bursting flows of the fluid (micro jet). This micro jet produces jet flow pressure, which is exerted on the first and second mounting member and transmitted to a body of the vehicle as noises or vibrations. The prevent invention has developed on the basis of this knowledge.

A first mode of the present invention provides a fluid-filled vibration damping device comprising: a first mounting member; a second mounting member; a rubber elastic body elastically connecting the first and second mounting member, and partially defining a pressure-receiving chamber filled with a non-compressible fluid whose pressure is varied upon application of vibration between the first and second mounting member; a flexible layer partially defining an equilibrium chamber filled with the non-compressible fluid and whose volume is changed due to deformation of the flexible layer; an orifice passage permitting a fluid communication between the pressure-receiving chamber and equilibrium chamber; and a cushion surface situated opposite to an opening of the orifice passage to the pressure-receiving chamber in a first direction of flow of the fluid into and out of the opening, with a predetermined distance therebetween, while extending in a second direction approximately perpendicular to the first direction.

As a result of a large number of experiments conducted by the present inventors, was confirmed the fact that cavitation bubbles as a basic cause of undesirable noises or vibrations are generated at around a specific position in the pressure-receiving chamber, more specifically, the opening of the orifice passage to the pressure receiving chamber. It was also revealed that the generated bubbles gradually grow as they move toward and are dispersed into the inside of the pressure-receiving camber, and are finally bursted and disappeared, while producing jet flow pressure. While it has not still been revealed the reasons of occurrence of cavitation bubbles at around the opening of the orifice passage to the pressure-receiving chamber, the cavitation bubbles might be generated as a result of a kind of breakdown in fluid flow that is caused by considerable decompression generated at around the opening of the orifice passage to the pressure-receiving chamber. Namely, the considerable decompression may be basically caused by a phase difference between fluid pressure variation generated in the pressure-receiving chamber as a result of resonance of the fluid flowing through the orifice passage, and fluid pressure variation caused in the pressure-receiving chamber due to vibrations applied to the pressure-receiving chamber, while being influenced by a fluid decompression level, a fluid temperature, a state of fluid flow, surface tension and viscosity of the fluid and the like.

According to the present mode of the invention, the cushion surface is formed opposite to the opening of the orifice passage to the pressure-receiving chamber. With this arrangement, if bubbles are generated at around the opening of the orifice passage as a result of considerable decompression generated in the pressure-receiving chamber due to application of impulsive vibrational load between the first and second mounting members, these bubbles come into impact against the cushion surface in the initial stage of their travels toward the inside of the pressure-receiving chamber. This arrangement permits a fragmentation of the bubbles into tiny ones in the earliest stage of growing of the generated bubbles, thus minimizing the size of each bubble growing in the pressure-receiving chamber. Accordingly, the size of each grown bubble can be minimized at the time when it is bursted, thereby minimizing energy of jet flow generated upon bursting of the bubble. This makes it possible to eliminate or minimize undesirable noises and vibrations generated when the excessive vibrational load is applied between the first and second mounting members.

A second mode of the invention provides a fluid-filled vibration-damping device according to the first mode, wherein the cushion surface has a size large enough to spread over an entire of the opening of the orifice passage as seen in the first direction. According to this mode, the cushion surface has a sufficiently large area so that all bubbles generated at around the opening of the orifice passage to the pressure-receiving chamber, and moving towards the inside of the pressure-receiving chamber can come into impact against the cushion surface, thus effectively avoiding that the generated bubbles miss the cushion surface and directly come to the inside of the pressure-receiving chamber to be grown larger.

A third mode of the invention provides a fluid-filled vibration-damping device according to the first or second mode, wherein the cushion surface is slightly inclined toward a center of the pressure receiving chamber relative to the second direction. According to this mode, the bubbles generated at around the opening of the orifice passage to the pressure-receiving chamber are fragmented when coming into impact against the cushion surface, and then are guided or introduced to a relatively wide area on the center side of the pressure receiving chamber. This arrangement is effective to prevent the bubbles once fragmented are gathered in a considerably confined area in the pressure receiving chamber, and reunited together to become big bubbles. Additionally, this arrangement permits that a series of phenomena including fragmentation, growing and bursting of bubbles are induced in the area close to the center of the pressure-receiving chamber, making it possible to moderate transmission of the jet flow energy generated upon bursting of the bubbles to the external area, in comparison with the case where the bubble bursting is occurred at an area in the vicinity of the rigid material partially defining the pressure receiving chamber, such as the second mounting member. Thus, the fluid-filled vibration-damping device of this mode is capable of further effectively eliminating or minimizing noises and vibrations.

A fourth mode of the invention provides a fluid-filled vibration-damping device according to any one of the first through third modes, further comprising a partition member fixedly supported by the second mounting member such that the partition member is disposed between the pressure receiving chamber and the equilibrium chamber, and at least partially defining the orifice passage; and a cushion member provided with the partition member to form the cushion surface.

A fifth mode of the invention provides a fluid-filled vibration-damping device according to any one of the first through fourth modes, further comprising a cushion member formed of a rigid material, the cushion member is supported by a member partially defining a pressure receiving chamber via an elastic support member in a vibration damping fashion, and is adapted to provide the cushion surface. In the aforementioned first through fourth modes of the invention, the cushion surface formed of a rubber elastic body or any other elastic material is included within the scope. In the present mode of the invention, especially, the cushion surface is constituted by means of the cushion member of rigid material. The cushion surface of this type is able to effectively fragment the bubbles brought into impact thereto, permitting further advantageous elimination or attenuation of noises or vibrations. In addition, the rigid cushion member is elastically supported by the member partially defining the pressure-receiving chamber (e.g., the first mounting member, the second mounting member, the partition member or the like), so that energy upon collision of the bubbles to the cushion member, or jet flow energy generated upon bursting of the bubbles in the pressure-receiving chamber is less likely to transmitted via the cushion member to the member partially defining the pressure-receiving chamber, thus eliminating or minimizing a likelihood of occurrence of noises or vibrations due to such energy transmission via the rigid cushion member to the member partially defining the pressure-receiving chamber. In the present mode, the cushion member may be formed of a variety of rigid materials including metallic materials such as aluminum alloy, and a variety of synthetic resin materials. In order to further attenuation of these noises and vibrations, the rigid cushion member may be at least partially coated by a rubber layer.

A six mode of the invention provides a fluid-filled vibration-damping device according to the fifth mode, wherein the elastic support member is disposed about the opening of the orifice passage to the pressure-receiving chamber, while projecting toward the pressure-receiving chamber, and the cushion member is supported by the elastic support member such that the cushion member is located above and spread over the opening of the orifice passage.

A seventh mode of the invention provides a fluid filled vibration-damping device according to any one of the first through sixth modes of the invention, wherein the first and second mounting members are formed of a rigid material, and surfaces of the first and second mounting members exposed to the pressure-receiving chamber are coated by rubber layers, substantially entirety. In this arrangement, the rubber layer can function as a buffer or a vibration damper, thereby effectively eliminating or minimizing noises of vibrations caused due to the jet flow energy generated upon bursting of the bubbles and exerted on the member exposed to the pressure receiving chamber (e.g., the first mounting member, the second mounting member, the partition member or the like).

An eighth mode of the invention provides a fluid filled vibration-damping device according to any one of the first through seventh modes of the invention, further comprising a movable rubber plate partially defining the pressure receiving chamber, the movable rubber plate being elastically deformed so as to absorb fluid pressure variation in the pressure receiving chamber upon application of vibration whose frequency is higher than a frequency to which the orifice passage is tuned. According to this mode, the elastic deformation of the movable rubber plate exhibits a fluid pressure moderation effect to the pressure-receiving chamber, so that the fluid-filled vibration damping device can exhibit high damping performance with respect to a high frequency band, while restricting generation and growing of cavitation bubbles in the pressure receiving chamber. Thus, the fluid-filled vibration-damping device of this mode is able to further advantageously minimize generation of noises or vibrations upon application of excessively large vibrational loads thereto.

A ninth node of the invention provides a fluid filled vibration-damping device according to any one of the first through eighth modes, wherein the second mounting member has an approximately cylindrical configuration, and one of opposite open-end portions of the second mounting member is fluid-tightly closed by the rubber elastic body elastically connecting the second mounting member and the first mounting member disposed on a side of the one of opposite open-end portions with a distance therebetween, while an other one of opposite open-end portions of the second mounting member is fluid-tightly closed by the flexible layer so as to provide a fluid sealing area defined between the rubber elastic body and the flexible layer and filled with the non-compressible fluid, wherein the partition member is fixedly supported by the second mounting member such that the partition member extends in an approximately axis-perpendicular direction of the second mounting member so as to divide the fluid sealing area into the pressure receiving chamber and the equilibrium chamber, and the orifice passage is at least partially defined by an outer circumferential portion of the partition member so as to extend in a circumferential direction of the partition member, and an annular elastic support projection is formed on a surface of the orifice passage exposed to the pressure receiving chamber, and has a void at a circumferential position thereof at which the opening of the orifice passage to the pressure-receiving chamber is open, and wherein a cushion member of annular configuration is superposed on and bonded to an projecting end face of the annular elastic support projection so that the cushion member provides the cushion surface opposing to the opening of the orifice passage to the pressure-receiving chamber at a circumferential portion thereof situated on the void of the annular elastic support projection.

According to this mode, the cushion member is elastically supported by the partition member via the annular elastic support projection in a consistent manner, so that transmission of jet flow energy caused by bursting of the bubbles to the external area via the cushion member is advantageously prevented with the help of vibration isolating function of the annular elastic support projection. Further, since the elastic support projection is bonded to the surface of the partition member facing to the pressure-receiving chamber such that the elastic support projection extend circumferentially at a circumferential portion of the surface of the partition member, the vibration isolating function of the elastic support projection is exhibited to the partition member, further minimizing transmission of the jet flow energy during bursting of the bubbles to the external area through the partition member.

A tenth mode of the invention provides a fluid-filled vibration-damping device according to the ninth mode, wherein the annular elastic support projection includes a plurality of pinholes open in the projecting end face thereof at respective circumferential positions, which is formed by means of positioning pins for positioning the partition member within a mold cavity for forming the annular elastic support projection, and the cushion member includes a plurality of engaging pins projecting outward from one of opposite surfaces thereof at respective circumferential positions corresponding to that of the pinholes, the plurality of engaging pins of the cushion member being brought into press fit engagement with the plurality of pinholes of the annular elastic support projections, respectively. This arrangement makes it possible to fasten the cushion member to the partition member by means of a simple fastening structure that is produced by effectively utilizing pinholes formed in the elastic support projection upon forming thereof.

BRIEF DESCRIPTION OF THE DRAWINGS

The forgoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
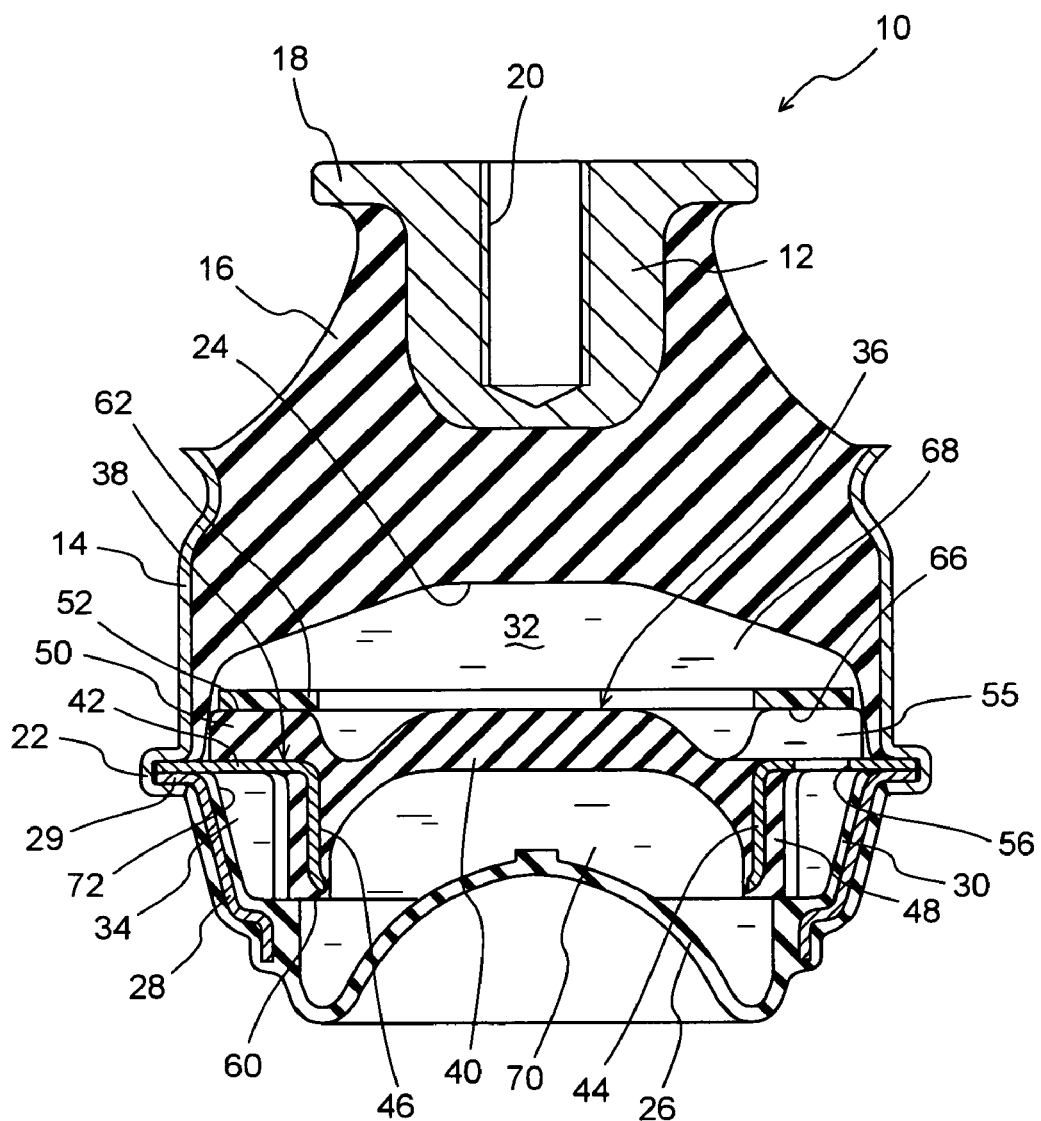
FIG. 1 is an elevational view in axial or vertical cross section of a fluid-filled vibration-damping device in the form of an engine mount for use in an automotive vehicle, which is constructed according to a first embodiment of the invention, which is taken along line 1—1 of FIG. 4.

Referring first to FIG. 1, shown is a fluid-filled vibration-damping device in the form of an engine mount 10 for use in automotive vehicles, which is constructed according to a first embodiment of the invention. The engine mount 10 is of structure having a first mounting member 12 of metal, a second mounting member 14 of metal and a rubber elastic body 16 by which the first and second mounting member are elastically connected with each other. The first mounting member 12 is mounted on a power unit side, while the second mounting member 14 is mounted on a body side of an automotive vehicle, so that the power unit is mounted on the body of the vehicle in a vibration damping fashion, via the engine mount 10. In the following description, the vertical direction will be basically used to refer to the vertical direction as seen in FIG. 1, or approximately the vertical direction of the engine mount 10 installed on the vehicle as described above in which a vibrational load is primarily applied to the elastic mount 10.

Described more specifically, the first mounting member 12 has an approximately solid cylindrical block shape provided with a flange portion 18 integrally formed at its upper end portion in the axial direction, while extending diametrically outwardly. The first mounting member 12 is also provided with a tapped hole 20 open in an upper end face thereof and extending downward along a center axis thereof with a given axial direction. By means of a fastening bolt threaded into the tapped hole 20, the first mounting member 12 is fixed to the power unit (not shown) of the vehicle.

The second mounting member 14 has a large-diameter generally cylindrical configuration, and is formed with a caulking portion 22 extending diametrically outward at a lower open-end portion in the axial direction thereof. The first mounting member 12 is disposed above and away from the second mounting member 14 in the axial direction in an approximately coaxial fashion. The first and second mounting members 12, 14 are elastically connected with each other via the rubber elastic body 16.

The rubber elastic body 16 has an approximately truncated conical configuration in its entirety, and is formed with a large-diameter recess 24 open in its large-diameter end face. During vulcanization of a rubber material for forming the rubber elastic body 16, the rubber elastic body 16 is bonded at its small-diameter end face to the first mounting member 12, while being bonded at an outer circumferential surface of its large-diameter end portion to the second mounting member 14. Namely, the rubber elastic body 16 provides an integrally vulcanized product including the first mounting member 12 and the second mounting member 14. With this arrangement, the first mounting member 12 extends into the rubber elastic body 16 form the small-diameter end face, whereby the substantially entire area, except an upper axial end face, of the first mounting member 12 is coated by the rubber elastic body 16. On the other hand, the second mounting member 14 is disposed about and bonded onto the large-diameter end portion of the rubber elastic body 16, over its substantially entire inner surface area, except the caulking portion 22.

A flexible layer in the form of a flexible diaphragm 26 is disposed at an lower open-end portion of the second mounting member 14 in the axial direction, so as to fluid-tightly close the lower open-end portion. The flexible diaphragm 26 is a thin rubber layer of canopy like shape, having a slag enough to facilitate its elastic deformation. To the periphery of the flexible diaphragm 26, is bonded a fixing metal 28 of approximately cylindrical configuration. Namely, the periphery of the flexible diaphragm 26 is bonded to an axially lower edge portion of the fixing metal 28 through vulcanization of a rubber material for forming the flexible diaphragm 26. To an axially upper edge portion of the fixing metal 28, on the other hand, a fixing flange portion 29 extending diametrically outward is integrally formed. The fixing flange portion 29 is superposed onto the caulking portion 22 provided at the lower open-end portion of the second mounting member 14, and is fixed by caulking to the second mounting member 14 fluid-tightly. In the present embodiment, inner and outer circumferential surfaces of the fixing metal 28 are substantially entirely coated by a thin coating rubber layer 30 integrally formed with the flexible diaphragm 26.

As illustrated above, the second mounting member 14 is fluid-tightly closed at its upper open-end portion by means of the rubber elastic body 16, and at its lower open-end portion by means of the flexible diaphragm 26, thereby defining between the rubber elastic body 16 and the flexible diaphragm 26 a fluid sealing area 32 sealed off from the external area. This fluid sealing area 32 is filled with a non-compressible fluid. For effective damping of input vibration based on resonance of the fluid flowing through an orifice passage 34, which will be described later, it is preferable to employ a low-viscosity fluid whose viscosity is not higher than 0.1 Pa·s, such as water, alkylene glycol, polyalkylene glycol and silicone oil.

Figure 2:
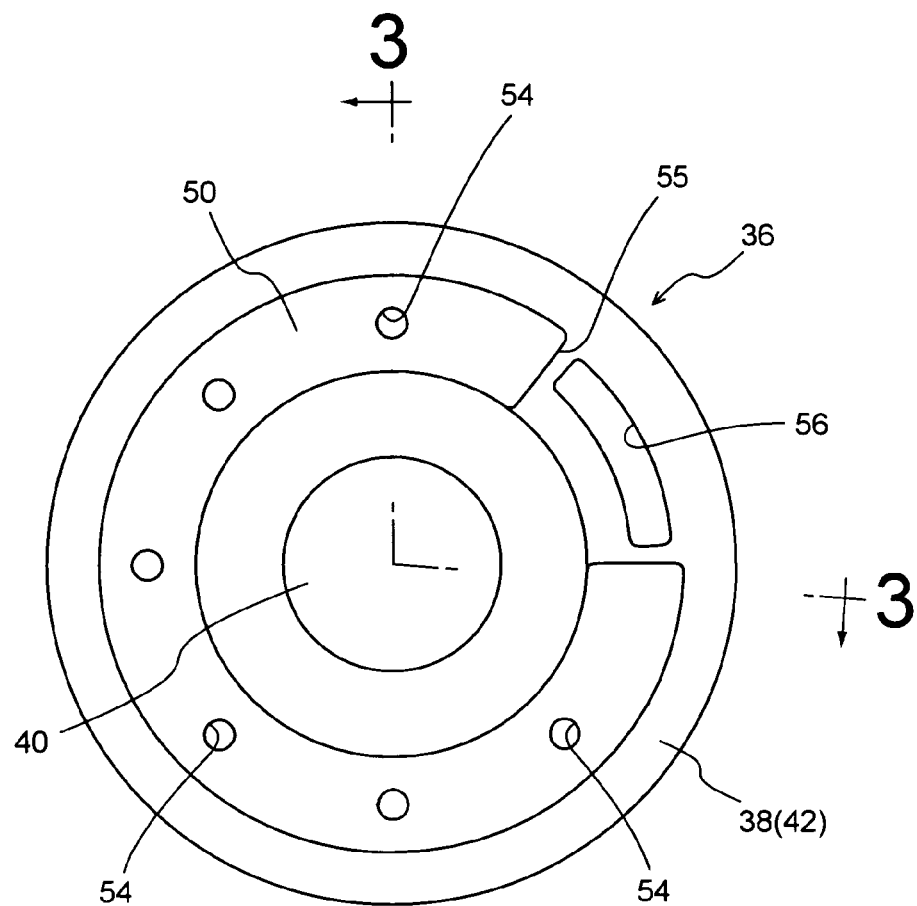
FIG. 2 is top elevational view of a partition member of the engine mount of FIG. 1.
Figure 3:
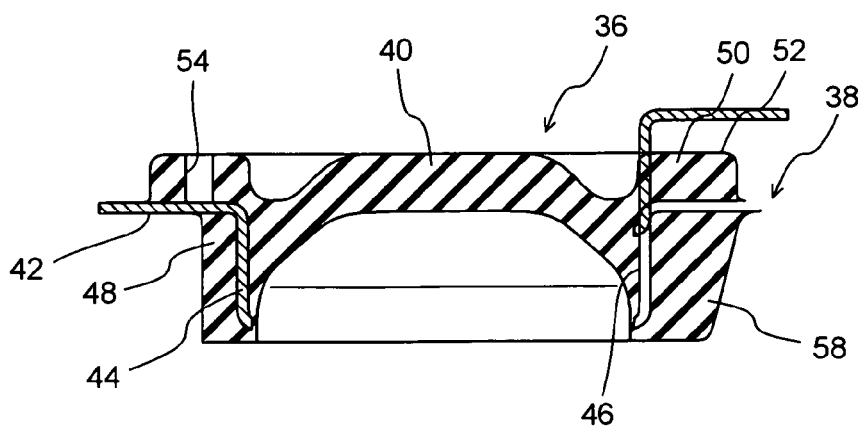
FIG. 3 is a cross sectional view taken along line 3—3 of FIG. 2.

The fluid sealing area 32 houses a partition member 36 disposed therein. The partition member 36 consists of a partition metal 38 of annular configuration, and a movable rubber plate 40 bonded to the partition metal 38. Described in detail, with reference to FIGS. 2–4, the partition metal 38 includes a plate portion 42 of annular plate configuration and a cylindrical wall portion 44 of cylindrical configuration extending axially downward from an inner peripheral portion of the plate portion 42. The plate portion 42 and the cylindrical wall portion 44 are formed integrally, so that the partition metal 38 has an approximately revolving body shape, extending in its circumferential direction with a constant "L" shape in cross section.

The movable rubber plate 40 has an overall thin-walled disk-like configuration. The peripheral portion of the movable rubber plate 40 extends downwards to form an inclined fringe, whereby the movable rubber plate 40 has an inverted dish-like configuration, where a central portion thereof project upward slightly. This movable rubber plate 40 is disposed in a central bore 46 of the partition metal 38, while extending in an axis perpendicular direction and being bonded at its inclined fringe to an inner circumferential surface of the cylindrical wall portion 44 of the partition metal 38, through vulcanization of a rubber material for forming the movable rubber plate 40. With this arrangement, the central bore 46 of the partition metal 38 is fluid-tightly closed.

In the partition member 46, the cylindrical wall portion 44 of the partition metal 38 is approximately entirely coated by a coating rubber layer 48 that is integrally formed with the movable rubber plate 40, and is bonded to the partition metal 38 upon vulcanization of a rubber material for forming thereof. On the plate portion 42 of the partition metal 38, an elastic support member in the form of an annular elastic support projection 50 is formed so as to project toward the pressure-receiving chamber 32 or project axially upward with a given height. The elastic support projection 50 is integrally formed with the movable rubber plate 40, and is bonded to the partition metal 38 upon vulcanization of a rubber material for forming thereof. This elastic support projection 50 extends continuously about an approximately entire circumference thereof with an approximately constant shape in cross section, while providing a flat plane extending in the axis perpendicular direction with its projecting end face 52.

The partition member 36 of construction as described above may be formed, for example, by using a mold whose mold cavity is designed to integrally form the movable rubber plate 40, the coating rubber layer 48, and the elastic support projection 50. First, the partition metal 38 formed in advance by pressing or the like is set in position within the mold cavity of the mold. Subsequently, a predetermined rubber material is injected into the mold cavity to fill the mold cavity. Then, the rubber material filled within the mold cavity is subjected to molding and vulcanization process, thereby producing the partition metal 36. According to this manufacturing method, the movable rubber plate 40, the coating rubber layer 48, as well as the elastic support projection 50 are integrally formed, and are bonded to the partition metal 38, simultaneously, thereby providing an integral vulcanized product in the form of partition member 36.

When setting the partition metal 38 to the predetermined position of the mold cavity, if the partition metal 38 is supported by being gripped with the mold at its outer peripheral portion, an inner peripheral portion of the partition metal 38 may possibly deformed. Accordingly, it is preferably to position and support the partition metal 38 to and at the predetermined position of the mold cavity by supporting the partition metal 38 at its inner peripheral portion as well as its outer peripheral portion. In this regards, a lower surface of the plate portion 42 is available for direct supporting by the mold over a sufficiently wide area of its inner peripheral portion extending to the coating rubber layer 48. However, the upper surface of the plate portion 42 is coated by the elastic support projection 50 formed thereon over a wide area extending across the inner and outer peripheral portions thereof, making it difficult to directly support the inner peripheral portion of the partition metal 38. To cope with this problem, a plurality of support pins are formed on the mold so as to project out from the mold cavity, whereby the upper surface of the plate portion 42 can be supported by the plurality of support pins at respective circumferential positions.

By forming the partition member 36 as illustrated above, the elastic support projection 50 is provided with a plurality of pin holes (six pinholes in the present embodiment), which are spaced away from one another in the circumferential direction, and which are open in the projecting end face 52 of the elastic support projection 50 and extending axially downward until they reach the plate portion 42 of the partition metal 38.

Figure 4:
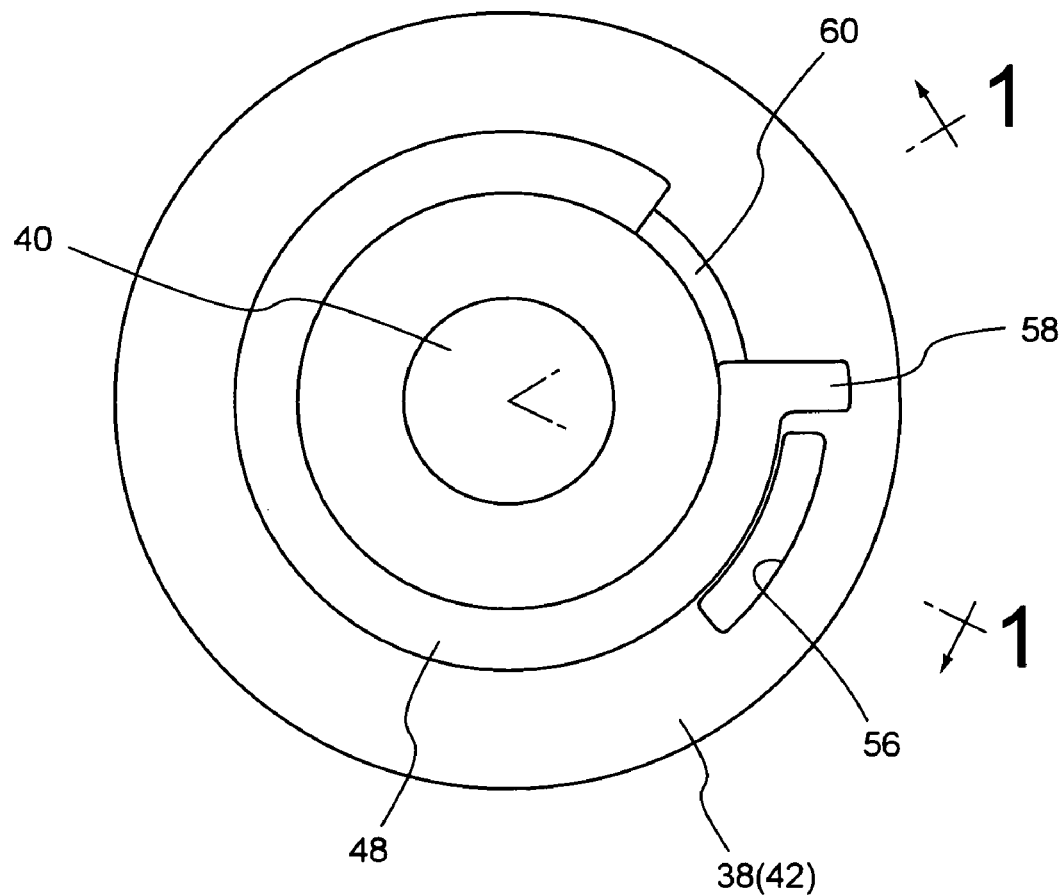
FIG. 4 is a bottom elevational view of the partition member of FIG. 2.

The elastic support projection 50 has a void 55 at a circumferential position thereof. This void 55 have a part of the plate portion 42 exposed to the atmosphere, and a communication hole 56 is formed through the exposed portion of the plate portion 42. The communication hole 56 functions as an opening of the orifice passage 34 to the pressure-receiving chamber 32. On the lower surface of the plate portion 42, as illustrated in FIG. 4, a partition wall 58 is formed in the vicinity of one of circumferentially opposite end portions of the communication hole 56. The partition wall 58 is situated on the side of the outer peripheral portion of the plate portion 42, and extends diametrically outward from the coating rubber layer 48, while being integrally formed with the coating rubber layer 48. On the other side of the partition wall 58 opposite the communication hole 56 in the circumferential direction, a communication hole 60 of cutout configuration is formed through the cylindrical wall portion 44 to be situated in the vicinity of the partition wall 58.

Figure 5:
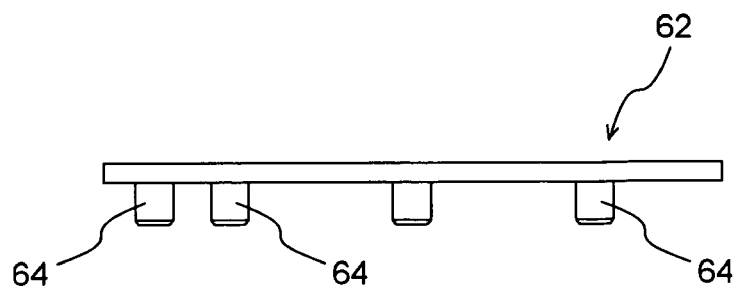
FIG. 5 is a front elevational view of a cushion plate of the engine mount of FIG. 2.
Figure 6:
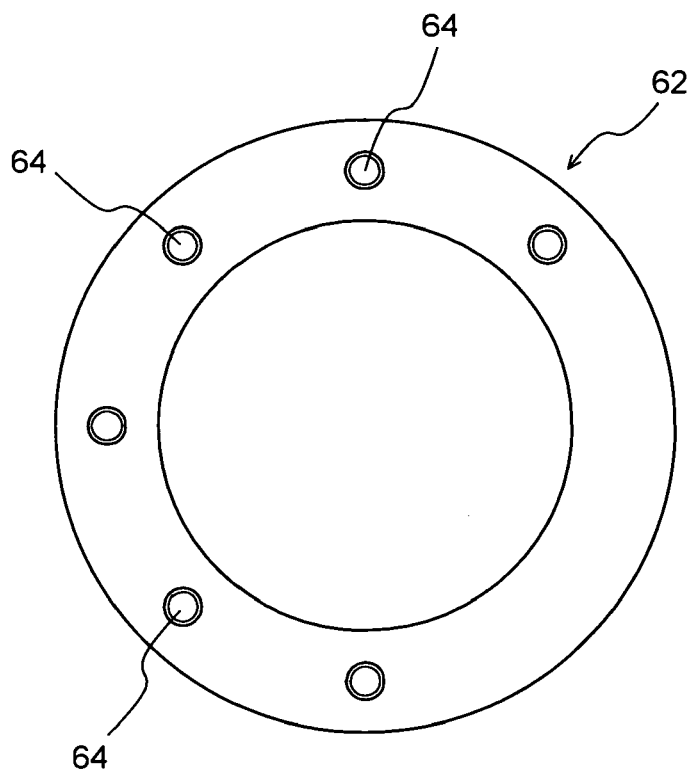
FIG. 6 is a bottom elevational view of the cushion plate of FIG. 5.

The partition member 36 is assembled with a cushion member in the form of a cushion plate 62 such that the cushion plate 62 is superposed on the projecting end face 52 of the elastic support projection 50. As solely shown in FIGS. 5 and 6, the cushion plate 62 has an overall configuration of thin annular plate, with an outside diameter substantially equal to or slightly smaller than that of the projecting end face 52. Thus, the cushion plate 62 is entirely superposed on the projecting end face 52 of the elastic support projection 50. The cushion plate 62 includes a plurality of engaging pins 64 formed on and projecting out from a lower surface of the cushion plate 62. With the cushion plate 62 superposed at its lower surface on the projecting end face 52, these engaging pins 64 are brought into press-fit engagement with the pinholes 54 open in the projecting end face 52 of the elastic support projection 50, respectively.

With the engaging pins 64 brought into press-fit engagement with the pinholes 54, which may be optionally reinforced by means of adhesive, the cushion plate 62 is fixed to the elastic support projection 50 with its lower surface held in close contact with the projecting end face 52. That is, the cushion plate 62 is elastically connected to the partition metal 38 via the elastic support projection 50. Since the cushion plate 62 is assembled with the partition member 36 as described above, the lower surface of the cushion plate 62 is exposed at a portion situated above the void 55 of the elastic support projection 50, and is directly opposed to the communication hole 56 formed through the partition metal 38 in the axial direction. With this arrangement, the cushion plate 62 provides a cushion surface 66 at the location directly opposite to the communication hole 56 in the axial direction as seen in FIG. 1, which is substantially equal to a direction of flow of the fluid into and out of the communication holes 56, and hereinafter is referred to as a first direction, where appropriate. The cushion surface 66 extends in a second direction perpendicular to the first direction.

The partition member 36 assembled with the cushion plate 62 is housed within the fluid sealing area 32 filled with the non-compressible fluid, and is disposed at the lower open-end portion of the second mounting member 14, while extending in the axis perpendicular direction. The outer peripheral portion of the partition metal 38 is held in contact with the caulking portion 22 of the second mounting member 14, and is fluid-tightly fixed to the lower open-end portion of the second mounting member 14, together with the fixing flange portion 29 of the fixing metal 28, by caulking the caulking portion 22 against these members.

The partition member 36, which is housed within the fluid sealing area 32 as described above, divides the fluid-sealing area 32 into two chambers, i.e. a pressure-receiving chamber 68 partially defined by the rubber elastic body 16 and an equilibrium chamber 70 partially defined by the flexible diaphragm 26. Upon application of vibrational load between the first and second mounting members 12, 14, the pressure receiving chamber 68 undergoes a fluid pressure variation due to elastic deformation of the rubber elastic body 16, while the equilibrium chamber 70 easily permits a volumetric change thereof due to elastic deformation of the flexible diaphragm 26, so as to promptly absorb fluid pressure variation.

On the outer circumferential side of the fluid sealing area 32, the partition metal 38 and the fixing metal 28 cooperate to define therebetween an annular section 72 extending circumferentially. By means of the partition wall 58, the annular section 72 is fluid-tightly blocked up at the circumferential position where the partition wall 58 is located, thereby forming the orifice passage 34 extending with an approximately constant cross sectional shape, over a length slightly smaller than a circumference of the annular section 72. One of opposite end of the orifice passage 34 is held in fluid communication with the pressure receiving chamber 68 through the communication hole 56, and the other end of the orifice passage 34 is held in fluid communication with the equilibrium chamber 70 through the communication hole 60. Therefore, the orifice passage 34 permits a fluid communication between the pressure-receiving chamber 68 and the equilibrium chamber 70.

When a vibrational load is applied between the first and second mounting members 12, 14 in the nearly axial direction, flows of the fluid through the orifice passage 34 is caused due to a relative pressure variation between the pressure receiving chamber 68 and the equilibrium chamber 70, whereby the engine mount 10 can exhibit excellent vibration damping effect on the basis of resonance of the fluid flowing through the orifice passage 34. A ratio of a cross sectional area to a length of the orifice passage 34 is suitably adjusted so that the engine mount 10 exhibits desired damping effect on the basis of the resonance of the fluid with respect to a desired frequency band. For instance, the orifice passage 34 may be adjusted so that the engine mount 10 can exhibit effective damping performance with respect to engine shakes or other low frequency vibrations that may be occurred during driving of the vehicle.

Moreover, the pressure receiving chamber 68 and the equilibrium chamber 70 are both partially defined by the movable rubber plate 40. With this arrangement, if the applied vibrational load has a frequency higher than the frequency to which the orifice passage 34 is tuned, the movable rubber plate 40 undergoes slight elastic displacement, thus making it possible to absorb or minimize fluid pressure variation occurred in the pressure receiving chamber by means of the slight elastic displacement of the movable rubber plate 40. Accordingly, the engine mount 10 of the present embodiment can also prevent significant increase in the dynamic spring constant thereof, and exhibit a high damping effect, when subjected to a booming noise or other vibrations extending over an intermediate and a high frequency band, which may occurred during idling of the vehicle.

In the event where the vehicle runs across a wave-type road or runs across a speed breaker or other hurdles, the engine mount 10 of described construction may be subjected to an impulsive vibrational load, and may suffer from a problem of cavitation bubbles formed in the fluid at around opening of the orifice passage 34 to the pressure-receiving chamber 68, i.e. the communication hole 56. The bubbles formed at around in the communication hole 56 are then dispersed into the fluid filling the pressure-receiving chamber 68. In this regards, since the cushion surface 66 is located just above the communication hole 56 with a slight gap distance therebetween, the bubbles initially come into impact against the cushion surface 66 in the course of their dispersion into the fluid within the pressure-receiving chamber 68.

When coming into impact against the cushion surface 66, the bubbles are directly exposed to external force, or fluid flows or billows as well as fluid pressure gaps induced in the pressure receiving chambers 68, thereby forcedly undergoing deformation and fragmentation thereof. As a result, the cavitation bubbles formed at around the communication holes 56 can effectively be fragmentized into tiny bubbles before being scattered over the pressure-receiving chamber 68. With this arrangement, even if a bubble glows up within the pressure-receiving chamber, and is finally bursted, the size of the bubble can be minimized.

Accordingly, the engine mount 10 makes it possible to minimize an energy of burst of the cavitation bubble, or a jet flow pressure of the fluid caused by the burst of the cavitation bubble formed within the pressure receiving chamber 68 due to the impulsive vibrational load applied to the engine mount 10. Thus, the engine mount 10 is capable of eliminating or minimizing noises and vibrations, which would be occurred in the vehicle due to the jet flow energy of the fluid occurred in the pressure receiving chamber 68 and transmitted to the body via the first and second mounting members 12, 14, thereby ensuring a comfortable driving of the vehicle.

The cushion plate 62 defining the cushion surface 66 may be formed of a rubber elastic body or other elastic members, or alternatively, may be formed of a rigid material such as aluminum alloy. Preferably, the cushion plate 62 is formed of a hard material such as synthetic resin. Namely, if the elasticity of the cushion plate 62 is too large, it becomes difficult to finely fragmentize the cavitation bubbles sufficiently, whereas if the rigidity of the cushion plate 62 is too large, the jet flow pressure, which may be caused during fragmentation of the bubbles impact against the cushion surface 66 as well as bursting of the bubbles within the pressure-receiving chamber 68, may possibly be transmitted to the body of the vehicle through the cushion plate 62 and the second mounting member 14.

The gap distance between the cushion surface 66 and the communication hole 56 is preferably dimensioned to be approximately equal to or slightly smaller than a width dimension of the communication hole 56. Namely, if the gap distance is too small, a relatively large resistance to flow is exerted on the fluid flowing through the gap, result in a likelihood of deterioration of damping performance of the engine mount 10 on the basis of resonance of the fluid flowing through the orifice passage 34. On the other hand, if the gap distance is too large, the bubbles formed at formed at around the communication hole 56 may deviate from and fail to come into impact against the cushion surface 66. In this state, the bubbles are prone to grow up, resulting in a relatively large energy of impact of the bubbles against the cushion surface 66, and a likelihood of insufficient fragmentation of the bubbles caused by the impact of the bubbles against the cushion surface.

Another advantage of the present embodiment is that the cushion plate 62 is formed of a hard synthetic resin material such as polypropylene, and is elastically supported by the partition metal 38 fixedly supported by the second mounting member 12, via the elastic support projection 50. This arrangement makes it possible to further effectively eliminate or minimize undesirable transmission of the jet flow pressure to the body of the vehicle, via the cushion plate 62. Preferably, the cushion plate 62 is disposed so as not to touch, and to be away from any member other than the elastic support projection 50. Likewise, a peripheral portion of the cushion plate 62 is preferably away from the rubber elastic body 16 with a slight gap therebetween, which is enough to prevent mutual contact between the cushion plate 62 and the rubber elastic body, thereby preventing transmission of the vibration energy to the any other members via the cushion plate 34.

Yet another advantage of the present embodiment is that all rigid members defining the pressure receiving chamber 68 (i.e. the second mounting member 14 and the partition metal 38) are entirely coated by the elastic body (i.e. the rubber elastic body 16 and the elastic support projection 50) at all faces defining the pressure-receiving chamber 68. This makes it possible to minimize direct transmission of the jet flow pressure, which is caused by bursting of the bubbles growing up in the pressure-receiving cavity, to these rigid members, and also makes it possible to give vibration damping effect to the rigid members. Thus, the engine mount 10 is capable of effectively eliminating or minimizing problems of noises and/or vibrations caused by cavitation bubbles formed in the pressure-receiving chamber 68.

Still another advantage of the present embodiment is that all rigid members defining the wall of the orifice passage 34 (i.e. the partition metal 38 and the fixing metal 28) are entirely coated by the elastic body (i.e. the elastic support projection 50 and the thin coating rubber layers 30, 48) fitted thereto at all faces defining the wall of the orifice passage 34. This arrangement effectively eliminates or minimizes problems of noises and/or vibrations due to resonance of these members 38, 24 or the like, which is caused by the jet flow pressure exerted on these members during fragmentation of bubbles.

While the presently preferred embodiment of the invention has been described above in detail for illustrative purpose only, it is to be understood that the invention is not limited to the details of the illustrated embodiment, but may be embodied with various other changes, modifications and improvements, which may occur to those skilled in the art, without departing from the spirit and scope of the invention, as illustrated in several other embodiments shown in FIGS. 7–12, for example. In the following embodiments the same reference numerals as used in the first embodiment are used for identifying the structurally corresponding elements or portions, and redundant descriptions for these elements are omitted.

Figure 7:
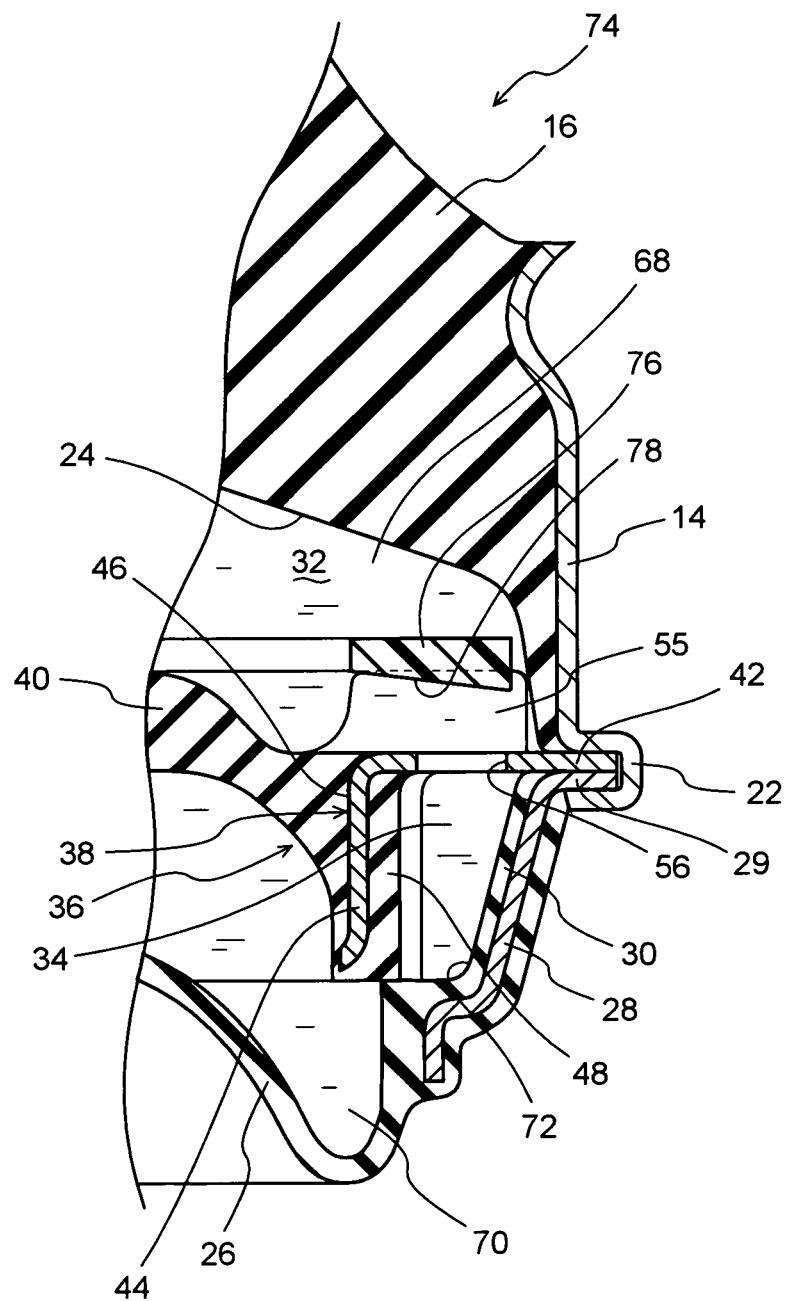
FIG. 7 is a fragmentary enlarged view in vertical cross section of an engine mount for use in automotive vehicles, which is constructed according to a second embodiment of the present invention.

FIG. 7 shows a fluid-filled vibration damping device in the form of an engine mount 74 constructed according to a second embodiment of the present invention. The engine mount 74 includes a cushion plate 76 that is different in construction from that of the cushion plate 62 employed in the engine mount 10 of the first embodiment. Namely, the cushion plate 76 is similar in overall construction to the cushion plate 62, but is different from the cushion plate 62 in the shape of a cushion surface 78 located above and opposed to the communication holes 56 situated at the void 55 of the elastic support projection 50. More specifically, the cushion surface 78 of the cushion plate 76 is an inclined plane that is inclined upward in the axial direction as its goes from its outside peripheral edge to its inside peripheral edge.

In the engine mount 74 constructed as described above, the cavitation bubbles formed at around the communication hole 56 come into impact against the cushion surface 78 in the course of their dispersion into the fluid within the pressure-receiving chamber 68, whereby the bubbles are fragmented or bursted into tiny bubbles. Thus, the engine mount 74 can enjoy the same advantages as described above with respect to the first embodiment. Additionally, with the help of a guide function of the cushion surface 78 extending diagonally upward as well as a buoyancy of each bubble, the tiny bubbles impacted against the cushion surface 78 are actively introduced into the center of the pressure-receiving chamber 68. This arrangement is able to prevent the tiny bubbles once fragmented from being accumulated in a corner of the pressure-receiving chamber 64 and reunited together. Further, this arrangement makes it possible to have all phenomena including growing and bursting of bubbles occurred in the central portion of the pressure-receiving chamber 68 where is spaced away from the second mounting member 14 as much as possible. Accordingly, it is further effectively prevented or avoided undesirable transmission of the jet flow pressure generated upon bursting of the bubbles to the body of the vehicle via the second mounting member 14.

Figure 8:
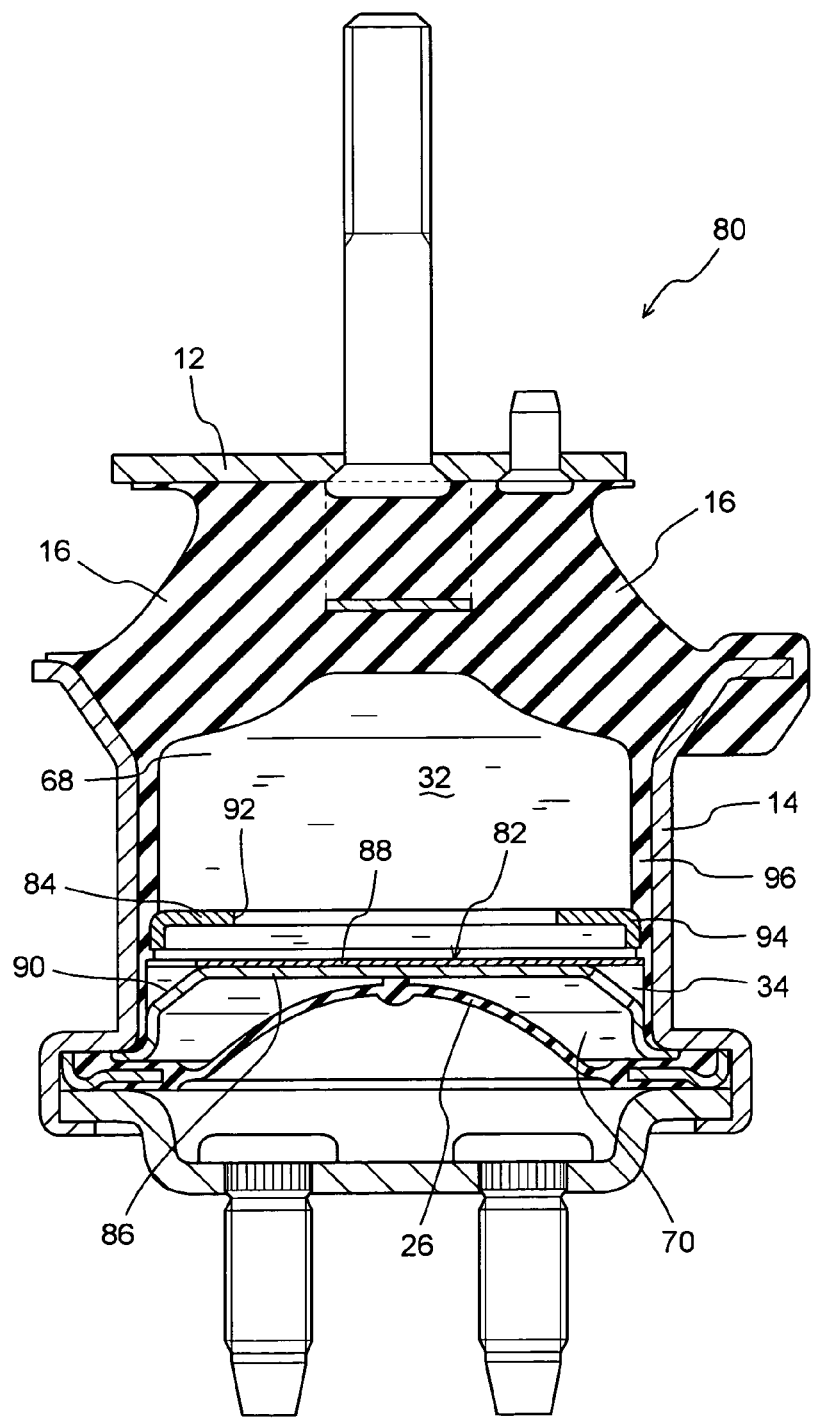
FIG. 8 is an elevational view in axial or vertical cross section of an engine mount for use in an automotive vehicles, which is constructed according to a third embodiment of the invention.

Referring next to FIG. 8, shown is a fluid-filled vibration damping device in the form of an engine mount 80 constructed according to a third embodiment of the present invention. The engine mount 80 includes a partition member 82 and a cushion plate 84, which are different in construction from those in the first embodiment. Described in detail, the partition member 82 includes a partition metal 86 of inverted shallow cup-like configuration, and a disk-shaped lid metal 88 bonded in close contact with a central portion of a top end face of the partition metal 86 so that a peripheral portion of the lid metal 88 protrudes diametrically outward from an edge of the central portion of the top end face of the partition metal 86. This peripheral portion of the lid metal 88 is situated opposite to a sloped peripheral portion of the top end face of the partition metal 86 with an axial gap therebetween, to thereby define therebetween a circumferential groove 90 open in an outer circumference thereof. The partition metal 86 is fixed at its open-end peripheral portion to the second mounting member 14 by means of caulking portion 22 caulked against the partition metal 86, while the peripheral portion of the lid metal 86 is fluid-tightly fitted into an inner circumferential surface of the second mounting member 14. With this state, the opening of the circumferential groove 90 is fluid-tightly closed by the inner circumferential surface of the second mounting member 14, thereby providing the orifice passage 34 whose opposite ends are connected with the pressure-receiving chamber 68 and the equilibrium chamber 70 for permitting a fluid communication between these two chambers therethrough.

On the other hand, the cushion plate 84 is an annular plate member having a center bore 92 of large diameter. A fitting projection 94 is integrally formed at a peripheral portion of the cushion plate 84 so as to protrude axially downward. This cushion plate 84 is secured press fit into the second mounting member 14 such that the cushion plate 84 extends in an axis-perpendicular direction at a location spaced away from the partition member 82 by a given distance in the axially upward direction. In this regards, the inner circumferential surface of the second mounting member 14 is substantially entirely coated by a sealing rubber layer 96 bonded thereto, whereby the partition metal 86, the lid metal 88 and the cushion plate 84 are fluid-tightly secured press fit into the sealing rubber layer 96, and cushion plate 84 is also elastically supported by the second mounting member 14 via the sealing rubber layer 96 in a vibration damping fashion.

In the engine mount 80 of above described construction, one portion of an axially lower surface of the cushion plate 84 is directly opposite to the communication hole 56 of the orifice passage 34 formed through the partition member 82 with a given axial distance therebetween, in order to serve as the cushion surface 66. With this arrangement, the cavitation bubbles formed at around the communication holes 56 come into impact against the cushion surface 66, thereby undergoing deformation and fragmentation thereof. Thus, the engine mount 80 can enjoy the same advantages of the present invention as discussed above with respect to the first embodiment.

Figure 9:
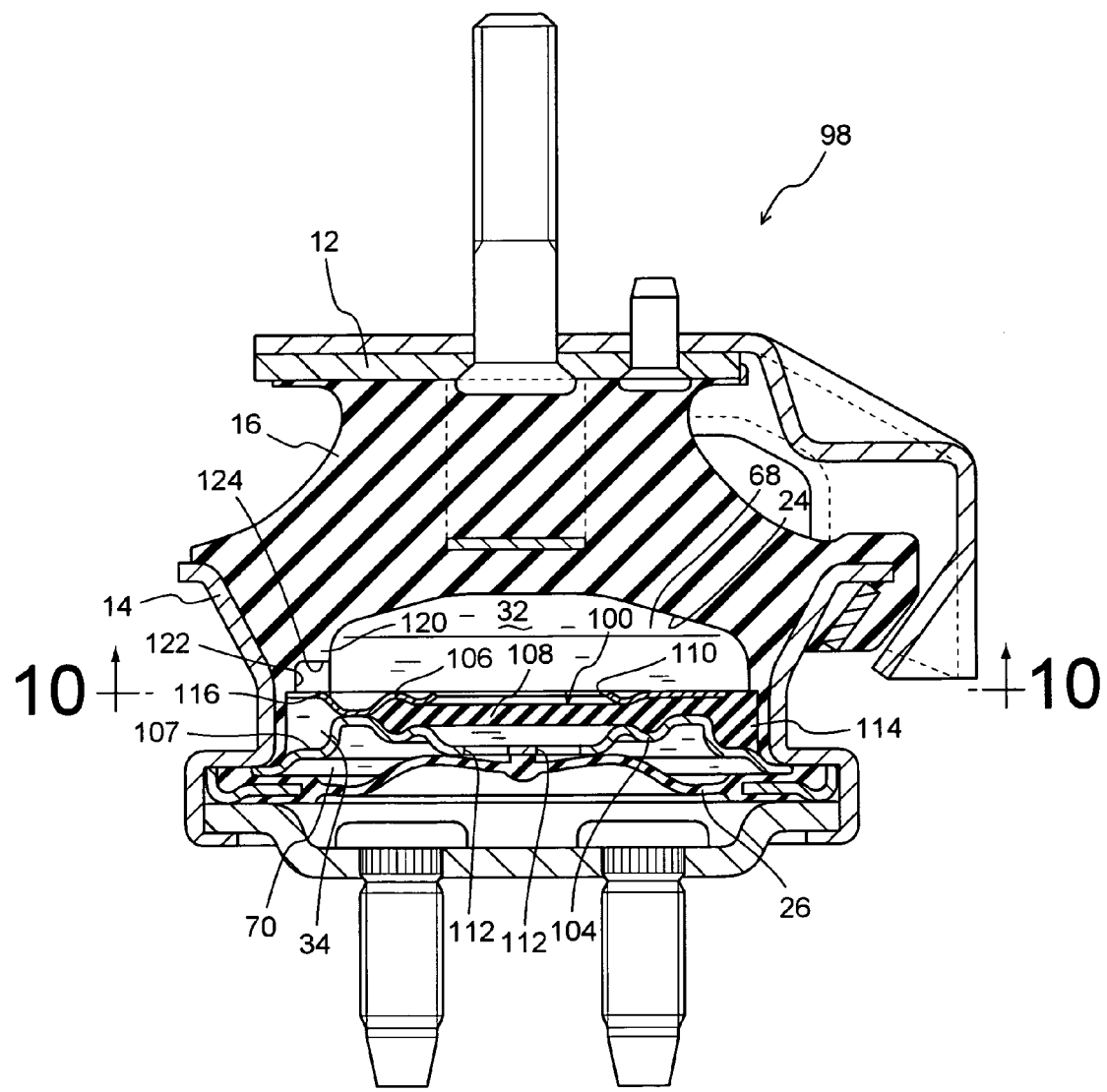
FIG. 9 is an elevational view in axial or vertical cross section of an engine mount for use in automotive vehicles, which is constructed according to a fourth embodiment of the invention.
Figure 10:
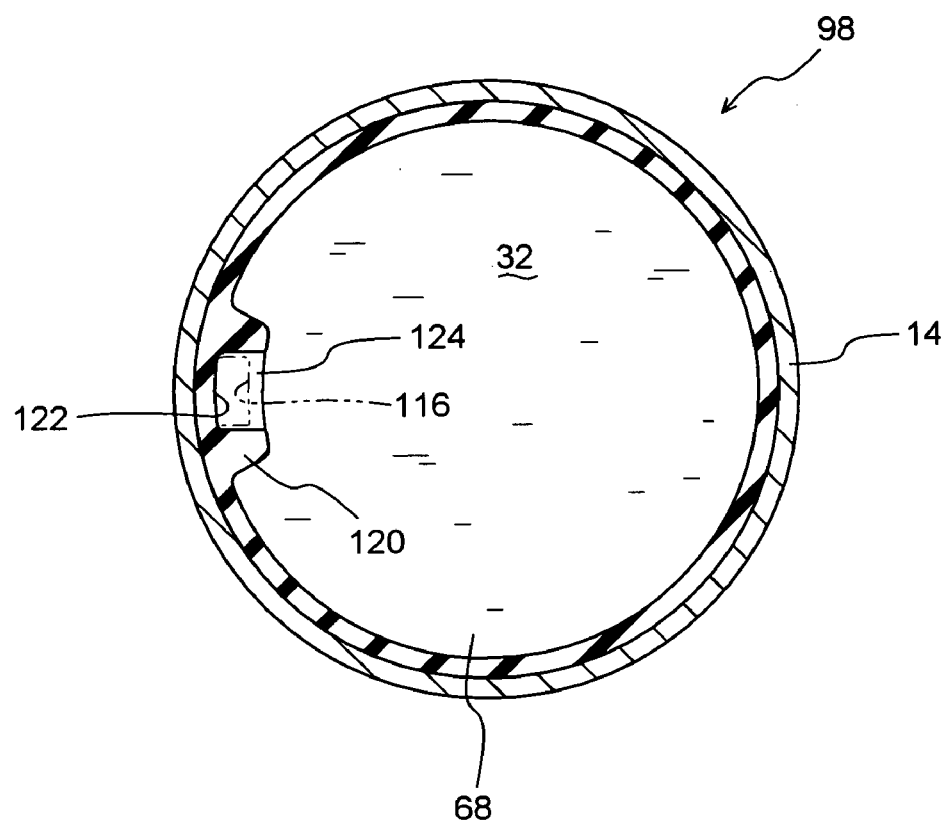
FIG. 10 is a cross sectional view taken along line 10—10 of FIG. 9.

Referring next to FIGS. 9 and 10, shown is a fluid-filled vibration damping device in the form of an engine mount 98 constructed according to a fourth embodiment of the present invention. The engine mount 98 includes a partition member 100 and a cushion plate, which are different in construction from those in the first embodiment. The partition member 100 includes a lower metal plate 104 of disk shape and an annular upper metal plate 106 that is superposed on and fixed to the lower metal plate 104. The upper and lower metal plates are axially spaced apart from each other in their outer peripheral portion, so as to define therebetween a circumferential groove 107 open in an outer circumference thereof.

A movable rubber plate 108 of disk-like configuration is disposed in a central portion of the partition member consisting of the upper and lower metal plates 106, 104. Described in detail, a periphery of the movable rubber plate 108 is compressed by and between annular grip portions formed at diametrically intermediate portions of the upper and lower metal plates 106, 104, which portions forcedly pressed to the peripheral portion of the movable rubber plate 108 from axially opposite sides of the movable rubber plate 108. With this arrangement, the movable rubber plate 108 is assembled with the partition member 100 such that a central portion of the movable rubber plate 108 is elastically deformable in a direction of its thickness. In the engine mount 98 of the construction discussed above, a fluid pressure in the pressure-receiving chamber 68 exerts on an upper surface of the movable rubber plate 108 through a central bore 110 of the upper metal plate 106, while a fluid pressure in the equilibrium chamber 70 exerts on a lower surface of the movable rubber plate 108 through a through holes 112 formed through the central portion of the lower metal plate 104.

The movable rubber plate 108 includes a partition wall 114 integrally formed at a circumferential portion thereof and extending diametrically outward so as to provide a circumferential block to the circumferential groove 107. An upper communication hole 116 is formed through the upper metal plate 106 and situated on one side of the partition wall 114 in the circumferential direction, and a lower communication hole (not shown) is formed through the lower metal plate 104 and situated on the other side of the partition wall 114 in the circumferential direction. Therefore, one end of the circumferential groove 107 is held in fluid communication with the pressure-receiving chamber 68 through the upper communication hole 116, and the other end of the circumferential groove 107 is held in fluid communication with the equilibrium chamber 70 through the lower communication hole, thus providing the orifice passage 34 permitting the fluid communication between the pressure receiving chamber 68 and the equilibrium chamber 70 therethrough.

In the engine mount 98, an open edge portion of the recess 24 of the rubber elastic body 16 is shaped to provide an integrally formed roof-like projection 120 at a circumferential portion thereof situated above the upper communication hole 116 that functions as the opening of the orifice passage 34 to the pressure receiving chamber 68. The roof-like projection 120 projects diametrically inward from the second mounting member 14, and includes a recess 122 to which the upper communication hole 116 is open. With this arrangement, an upper face 124 of the recess 122 is opposite to the upper communication hole 116 with a given axial gap therebetween. As is understood from the aforesaid description, the roof-like projection 120 functions as the cushion plate, and the upper face 124 functions as the cushion surface, in the present embodiment.

In the engine mount 98, since the upper face 124 is opposite to the upper communication hole 116 with the given axial gap therebetween, and functions as the cushion surface as described above, the cavitation bubbles formed at around the communication holes 116 come into impact against the upper face 124, thereby undergoing deformation and fragmentation thereof. Thus, the engine mount 98 of this embodiment can enjoy the same advantages of the present invention as discussed above with respect to the first embodiment.

Figure 11:
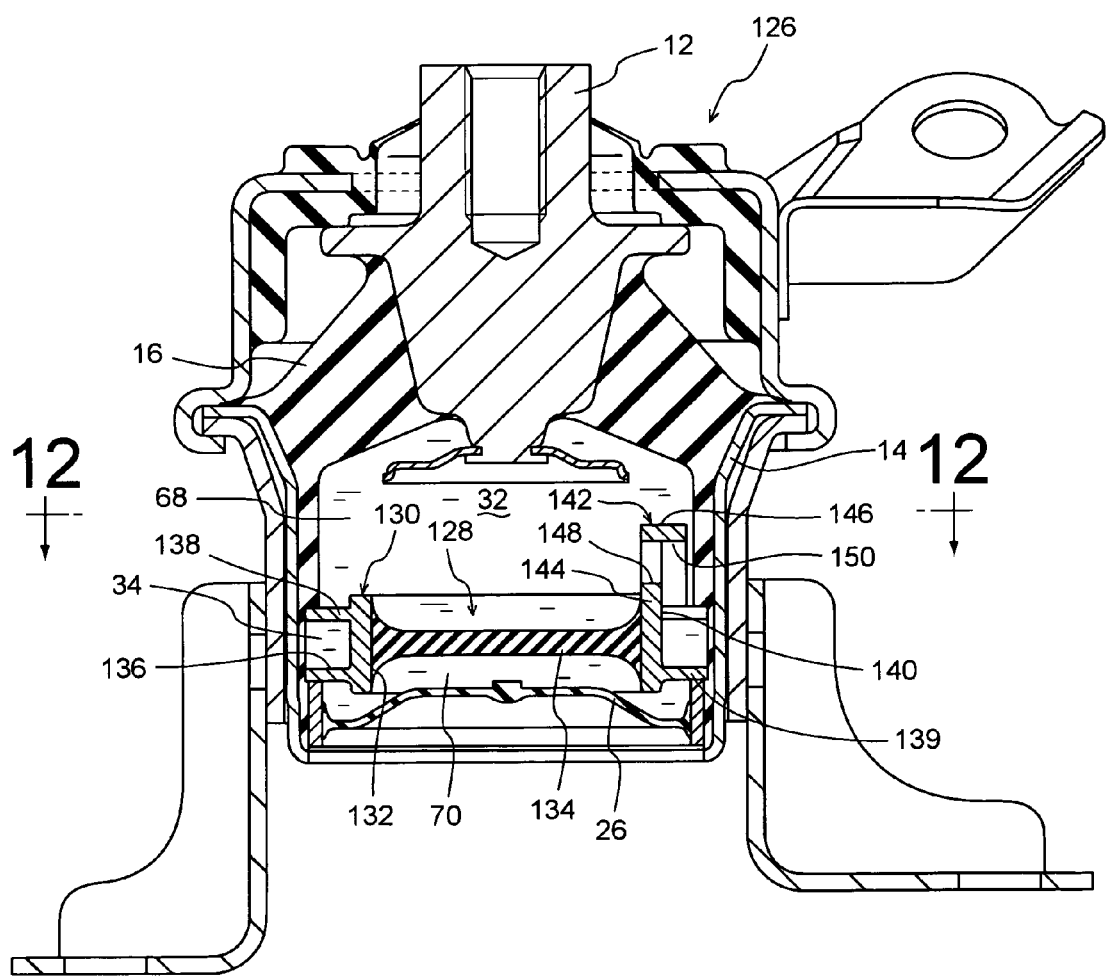
FIG. 11 is an elevational view in axial or vertical cross section of an engine mount for use in automotive vehicles, which is constructed according to a fifth embodiment of the invention, which is taken along line 11—11 of FIG. 12.
Figure 12:
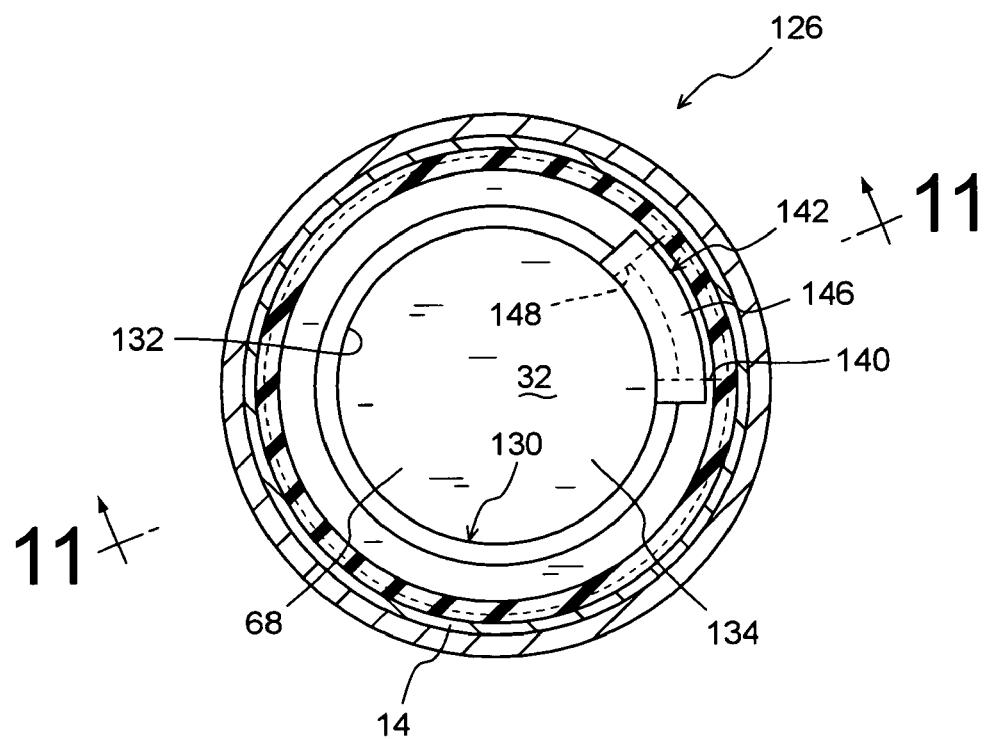
FIG. 12 is a cross sectional view taken along line 12—12 of FIG. 11.

Referring next to FIGS. 11 and 12, shown is a fluid-filled vibration damping device in the form of an engine mount 126 constructed according to a fifth embodiment of the present invention. The engine mount 126 includes a partition member 128 and a cushion plate, which are different in construction from those in the first embodiment. The partition member 128 includes an orifice-defining member 130 of annular configuration, and a disk-shape movable rubber plate 134 disposed within a center bore 132 of the orifice-defining member 130, such that an peripheral portion of the movable rubber plate 134 is bonded to an inner circumferential surface of the orifice defining member 130 through vulcanization of a rubber material for forming thereof. The orifice-defining member 130 is formed with a circumferential groove 136 open in its outer circumference, while extending in a circumferential direction by a given circumferential length. One of circumferentially opposite ends of the circumferential groove 136 is held in fluid communication with the pressure receiving chamber through a communication hole 140 formed through an upper wall portion 138 of the circumferential groove 136, and the other end of the circumferential groove 136 is held in fluid communication with the equilibrium chamber 70 through a communication hole (not shown) formed through a lower wall portion 139 of the circumferential groove 136, thereby providing the orifice passage 34 for permitting a fluid communication between the pressure-receiving chamber 68 and the equilibrium chamber 70 therethrough.

The orifice defining member 130 further includes a cover portion 142 integrally formed at a portion in which is open the communication hole 140 functioning as an opening of the orifice passage 34 to the pressure-receiving chamber 68, such that the cover portion 142 projects axially upward. This cover portion 142 includes a support portion 144 projecting upward from an inner periphery of the orifice defining member 130, and a roof portion 146 extending diametrically outward from a distal end of the support portion 144 so that the roof portion 146 is situated above and opposite to the communication hole 140 with a given axial gap therebetween. The support portion 144 is formed with a window 148 with an area larger than that of the communication hole 140, thereby permitting a fluid communication between the pressure-receiving chamber 68 and the communication hole 140 through the window 148.

In the engine mount 126, the roof portion 146 is opposite to the communication hole 140 with the given axial gap therebetween, and a lower surface 150 of the roof portion 146 is able to function as the cushion surface. Thus, the cavitation bubbles formed at around the communication hole 140 come into impact against the lower surface 150, thereby undergoing deformation and fragmentation thereof. Thus, the engine mount 126 of this amendment can enjoy the same advantages of the present invention as discussed above with respect to the first embodiment.

While not illustrated here, it will be understood that the invention may be suitably embodied in various kinds of modes. For instance, the cushion surface may optionally be rugged, or alternatively may be formed with a net structure to thereby be formed with a plurality or multiplicity of through holes open in the cushion surface.

A principle of the present invention may be applicable to a cylindrical fluid-filled vibration damping device as shown in Reference Nos. 4 and 5, or a fluid-filled vibration-damping device equipped with an active damping apparatus as shown in Reference No. 3, whereby these damping devices can effectively experience technical advantages of the present invention, likewise.

What is claimed is:

1. A fluid-filled vibration damping device comprising:
   a first mounting member;
   a second mounting member;
   a rubber elastic body elastically connecting the first and second mounting member, and partially defining a pressure-receiving chamber filled with a non-compressible fluid whose pressure is varied upon application of vibration between the first and second mounting member;
   a flexible layer partially defining an equilibrium chamber filled with the non-compressible fluid and whose volume is changed due to deformation of the flexible layer;
   an orifice passage permitting a fluid communication between the pressure-receiving chamber and equilibrium chamber; and
   a cushion surface situated opposite to an opening of the orifice passage to the pressure-receiving chamber in a first direction of flow of the fluid into and out of the opening, with a predetermined distance therebetween, while extending in a second direction approximately perpendicular to the first direction;
   wherein the orifice passage is partially defined by a partition member fixedly supported by the second mounting member such that the partition member is disposed between the pressure receiving chamber and the equilibrium chamber, the orifice passage circumferentially extending an outer circumferential portion of the partition member and being tuned so that the vibration damping device exhibits a damping performance with respect to low frequency vibrations based on flow action of the fluid flowing through the orifice passage;
   the cushion surface is defined by a member separate from the rubber elastic body elastically connecting the first and second mounting member, and fixedly supported by the second mounting member directly or indirectly;
   the cushion surface has a size large enough to spread over an entire of the opening of the orifice passage as seen in the first direction; and
   the cushion surface is disposed within the pressure receiving chamber so as to be opposite to the opening of the orifice passage to the pressure-receiving chamber from a pressure receiving chamber side,
   wherein the orifice passage is directly open to the pressure-receiving chamber without interposing a dilatation region formed by an open end portion of an other orifice passage to the pressure receiving chamber, which region has a cross section greater than that of the orifice passage.

2. A fluid-filled vibration-damping device according to claim 1, wherein the rubber elastic body includes an integrally formed projection so that the cushion surface is formed by utilizing a face of the integrally formed projection opposite to the opening of the orifice passage to the pressure-receiving chamber.

3. A fluid-filled vibration-damping device according to claim 1, wherein the cushion surface is slightly inclined toward a center of the pressure receiving chamber relative to the second direction.

4. A fluid-filled vibration-damping device according to claim 1, wherein a cushion member provided with the partition member to form the cushion surface.

5. A fluid-filled vibration-damping device according to claim 1, further comprising a cushion member formed of a rigid material, the cushion member is supported by a member partially defining a pressure receiving chamber via an elastic support member in a vibration damping fashion, and is adapted to provide the cushion surface.

6. A fluid-filled vibration-damping device according to claim 5, wherein the elastic support member is disposed about the opening of the orifice passage to the pressure-receiving chamber, while projecting toward the pressure-receiving chamber, and the cushion member is supported by the elastic support member such that the cushion member is located above and spread over the opening of the orifice passage.

7. A fluid-filled vibration-damping device according to claim 1, wherein the first and second mounting members are formed of a rigid material, and surfaces of the first and second mounting members exposed to the pressure-receiving chamber are coated by rubber layers, substantially entirety.

8. A fluid-filled vibration-damping device according to claim 1, further comprising a movable rubber plate partially defining the pressure receiving chamber, the movable rubber plate being elastically deformed so as to absorb fluid pressure variation in the pressure receiving chamber upon application of vibration whose frequency is higher than a frequency to which the orifice passage is tuned.

9. A fluid-filled vibration-damping device comprising:
   a first mounting member;
   a second mounting member;
   a rubber elastic body elastically connecting the first and second mounting member, and partially defining a pressure-receiving chamber filled with a non-compressible fluid whose pressure is varied upon application of vibration between the first and second mounting member;
   a flexible layer partially defining an equilibrium chamber filled with the non-compressible fluid and whose volume is changed due to deformation of the flexible layer;
   an orifice passage permitting a fluid communication between the pressure-receiving chamber and equilibrium chamber; and
   a cushion surface situated opposite to an opening of the orifice passage to the pressure-receiving chamber in a first direction of flow of the fluid into and out of the opening, with a predetermined distance therebetween, while extending in a second direction approximately perpendicular to the first direction,
   wherein the second mounting member has an approximately cylindrical configuration, and one of opposite open-end portions of the second mounting member is fluid-tightly closed by the rubber elastic body elastically connecting the second mounting member and the first mounting member disposed on a side of the one of opposite open-end portions with a distance therebetween, while an other one of opposite open-end portions of the second mounting member is fluid-tightly closed by the flexible layer so as to provide a fluid sealing area defined between the rubber elastic body and the flexible layer and filled with the non-compressible fluid, wherein a partition member is fixedly supported by the second mounting member such that the partition member extends in an approximately axis-perpendicular direction of the second mounting member so as to divide the fluid sealing area into the pressure receiving chamber and the equilibrium chamber, and the orifice passage is at least partially defined by an outer circumferential portion of the partition member so as to extend in a circumferential direction of the partition member, and an annular elastic support projection is formed on a surface of the orifice passage exposed to the pressure receiving chamber, and has a void at a circumferential position thereof at which the opening of the orifice passage to the pressure-receiving chamber is open, and wherein a cushion member of annular configuration is superposed on and bonded to a projecting end face of the annular elastic support projection so that the cushion member provides the cushion surface opposing to the opening of the orifice passage to the pressure-receiving chamber at a circumferential portion thereof situated on the void of the annular elastic support projection.

10. A fluid-filled vibration-damping device according to claim 9, wherein the annular elastic support projection includes a plurality of pinholes open in the projecting end face thereof at respective circumferential positions, which is formed by means of positioning pins for positioning the partition member within a mold cavity for forming the annular elastic support projection, and the cushion member includes a plurality of engaging pins projecting outward from one of opposite surfaces thereof at respective circumferential positions corresponding to that of the pinholes, the plurality of engaging pins of the cushion member being brought into press fit engagement with the plurality of pinholes of the annular elastic support projection, respectively.

* * * * *